(12) United States Patent
Zhao et al.

(10) Patent No.: US 8,135,531 B2
(45) Date of Patent: Mar. 13, 2012

(54) PREDICTIVE VEHICLE CONTROLLER

(75) Inventors: Side Zhao, Fairview, OR (US); Chenyao Chen, Fairview, OR (US)

(73) Assignee: NMHG Oregon, LLC, Fairview, OR (US)

( * ) Notice: Subject to any disclaimer, the term of this patent is extended or adjusted under 35 U.S.C. 154(b) by 810 days.

(21) Appl. No.: 12/256,445

(22) Filed: Oct. 22, 2008

(65) Prior Publication Data

US 2009/0048748 A1  Feb. 19, 2009

Related U.S. Application Data

(63) Continuation-in-part of application No. 11/516,913, filed on Sep. 6, 2006, now Pat. No. 7,974,760, which is a continuation-in-part of application No. 10/689,812, filed on Oct. 20, 2003, now Pat. No. 6,950,737, which is a continuation of application No. 10/209,444, filed on Jul. 30, 2002, now Pat. No. 6,684,148.

(60) Provisional application No. 60/983,018, filed on Oct. 26, 2007, provisional application No. 60/580,988, filed on Jun. 18, 2004, provisional application No. 60/388,522, filed on Jun. 12, 2002.

(51) Int. Cl.
*B60T 8/32* (2006.01)

(52) U.S. Cl. .......................... 701/93; 180/179

(58) Field of Classification Search ............ 701/59, 701/60, 93, 94, 98, 51; 180/170–179
See application file for complete search history.

(56) References Cited

U.S. PATENT DOCUMENTS

| | | | |
|---|---|---|---|
| 3,442,152 A | 5/1969 | Chana | |
| 3,893,552 A | 7/1975 | Dahl | |
| 4,129,148 A | 12/1978 | Lech | |
| 4,144,863 A | 3/1979 | Abdoo | |
| 4,574,927 A | 3/1986 | Sturtz, Jr. | |
| 4,838,622 A | 6/1989 | Kircher et al. | |
| 5,048,655 A | 9/1991 | Seeba | |
| 5,568,378 A | 10/1996 | Wojsznis | |
| 5,833,210 A | 11/1998 | Sommer | |
| 5,868,214 A * | 2/1999 | Workman | 180/179 |
| 5,901,059 A | 5/1999 | Tao et al. | |
| 5,918,509 A | 7/1999 | Heilig et al. | |
| 6,186,029 B1 | 2/2001 | McQuinn | |
| 6,335,609 B1 | 1/2002 | Amey et al. | |

(Continued)

FOREIGN PATENT DOCUMENTS

DE      3135055      4/1983

(Continued)

OTHER PUBLICATIONS

European Patent Office; European Search Report for EP08167535; Aug. 2, 2010.

(Continued)

*Primary Examiner* — Richard M. Camby
(74) *Attorney, Agent, or Firm* — Stolowitz Ford Cowger LLP

(57) ABSTRACT

Due to time delays, vehicle speed may become difficult to control. A predictive speed controller is configured to receive a desired speed request for a vehicle and simulate vehicle responses according to the desired speed request. A compensation value is derived from the simulated vehicle responses that compensates for the time delays of the vehicle. The actual speed of the vehicle is then controlled according to the compensation value.

24 Claims, 10 Drawing Sheets

U.S. PATENT DOCUMENTS

| | | | |
|---|---|---|---|
| 6,424,902 B1 * | 7/2002 | Kuras | 701/51 |
| 6,684,148 B2 | 1/2004 | Chess | |
| 6,901,324 B2 | 5/2005 | Rose et al. | |
| 7,006,909 B1 | 2/2006 | May | |
| 7,146,263 B2 | 12/2006 | Guven et al. | |
| 7,153,235 B2 | 12/2006 | Takamura et al. | |
| 7,524,268 B2 | 4/2009 | Oka et al. | |
| 7,974,760 B2 | 7/2011 | Rowley et al. | |
| 2002/0107111 A1 | 8/2002 | Murakami | |
| 2003/0209047 A1 | 11/2003 | Nelepovitz et al. | |
| 2005/0245351 A1 | 11/2005 | Yamada et al. | |
| 2006/0293822 A1 | 12/2006 | Lattemann et al. | |
| 2007/0010927 A1 | 1/2007 | Rowley et al. | |
| 2007/0179017 A1 | 8/2007 | Yamada et al. | |

FOREIGN PATENT DOCUMENTS

| | | |
|---|---|---|
| DE | 4321413 | 1/1995 |
| EP | 0010950 | 5/1980 |
| EP | 0299235 | 1/1989 |
| EP | 1031487 | 8/2000 |
| EP | 1093986 | 10/2000 |
| EP | 1371513 | 12/2003 |
| FR | 2739064 | 3/1997 |
| GB | 663704 | 12/1951 |
| GB | 717868 | 11/1954 |
| GB | 730576 | 5/1955 |
| GB | 803667 | 10/1958 |
| GB | 807395 | 1/1959 |
| GB | 863815 | 3/1961 |
| GB | 931262 | 7/1963 |
| GB | 974481 | 11/1964 |
| GB | 1010876 | 11/1965 |
| GB | 1017626 | 1/1966 |
| GB | 1028889 | 5/1966 |
| GB | 1050283 | 12/1966 |
| GB | 1236040 | 6/1971 |
| GB | 1331352 | 9/1973 |
| GB | 1337712 | 11/1973 |
| GB | 1520100 | 4/1977 |
| GB | 2262818 | 6/1993 |
| GB | 2322457 | 8/1998 |
| JP | 4869951 | 12/1971 |
| JP | 1240350 | 9/1989 |
| JP | 3007625 | 1/1991 |
| JP | 03292456 | 12/1991 |
| JP | 4134141 | 5/1992 |
| JP | 4140567 | 5/1992 |
| JP | 4325733 | 11/1992 |
| JP | 06034027 | 2/1994 |
| JP | 06247190 | 6/1994 |
| JP | 11078617 | 3/1999 |
| JP | 2001116070 | 4/2001 |
| JP | 2002235846 | 8/2002 |
| JP | 2002363038 | 12/2002 |
| JP | 2002367299 | 12/2002 |
| JP | 2003182408 | 7/2003 |
| WO | 2005021315 | 3/2005 |

OTHER PUBLICATIONS

Cooksley, "Stepless Changes", IVT Int'l, Issue Feb. 2001, 3 pgs.
Dicks, "Drive through hydrostatics", IVT '99—Lift Truck & Materials Handling, pp. 65-68.
Failing, Braking in the Wet, IVT Int'l, 2002, pp. 117-118.
Meinke et al., "Breaking News", IVT Int'l, 2002, 4 pgs.
Scheffels, "Transmission: auto, manual or both", IVT Int'l, Issue Feb. 2000, 3 pgs.
Scheffels, "Hydraulics—the advantages of electronics", IVT Europe, Mar. 1998, 5 pgs.
Scheffels, "Electronics on the advance", IVT Europe, Issue 3, Jul. 1998, 5 pgs.
Taylor et al., "Electronic hydrostatics—the future of transmissions", IVT—Materials Handling, Jan. 1998, 3 pgs.
European Patent Office, Supplementary Search Report for EP05766042; Aug. 31, 2011, 3 pages.
Stolowitz Ford Cowger LLP, "Listing of Related Cases", Nov. 29, 2011, 2 pages.
European Patent Office, European Search Report for EP02255419.0, Apr. 1, 2004, 5 pages.
European Patent Office, Extended European Search Report for EP08000084.7, Feb. 21, 2008, 6 pages.
European Patent Office, Examination Report for EP02255419.0, Nov. 2, 2005, 4 pages.
European Patent Office, Supplemental Examination Report for EP02255419.0, Jul. 18, 2008, 4 pages.

* cited by examiner

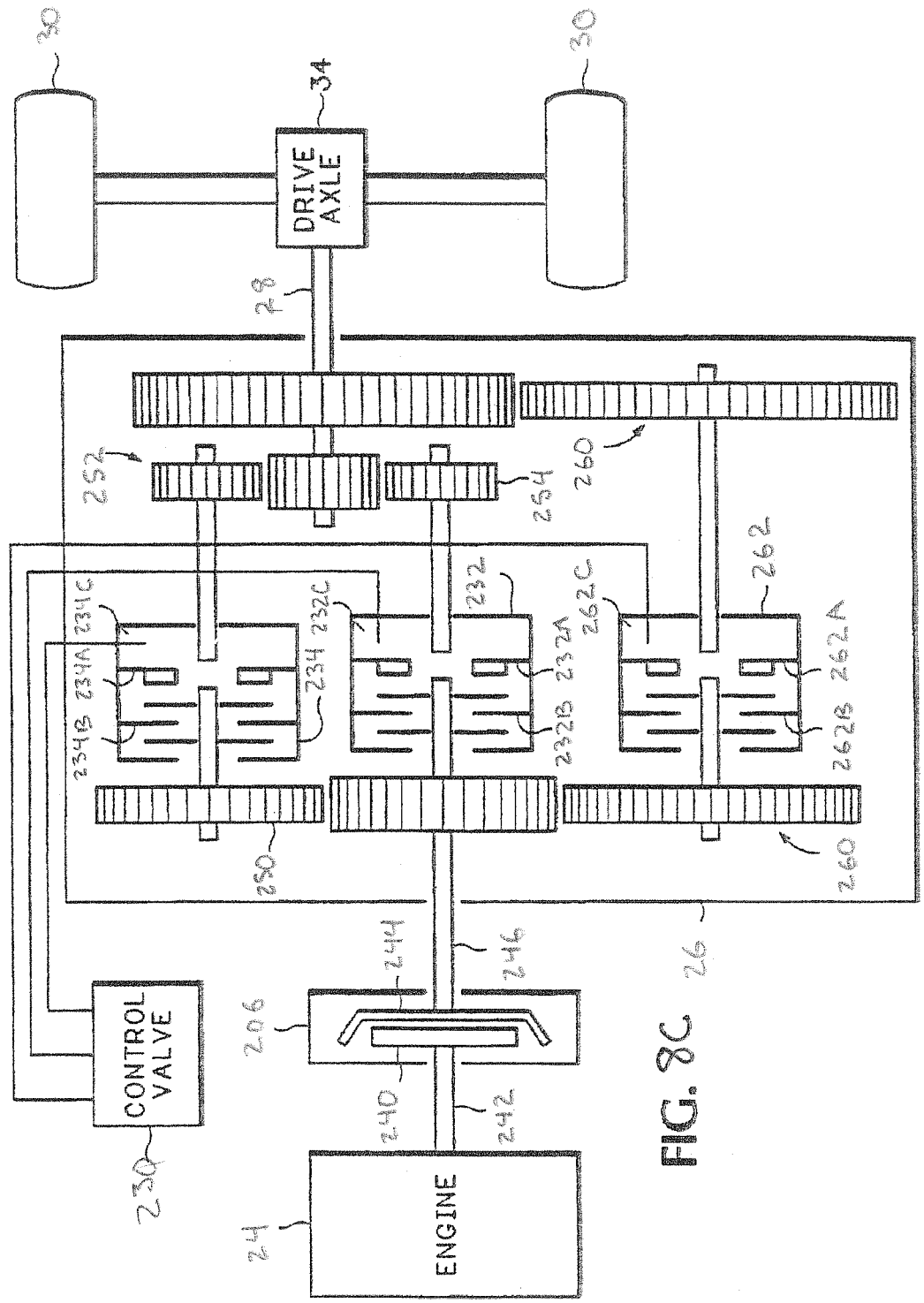

PREDICTIVE VEHICLE CONTROLLER

This application is a continuation-in-part of U.S. patent application Ser. No. 11/516,913, filed on Sep. 6, 2006, now U.S. Pat. No. 7,974,768; which claims priority to U.S. Provisional Patent Application Ser. No. 60/580,988, filed on Jun. 18, 2004, and is a continuation-in-part of U.S. patent application Ser. No. 10/689,812, filed on Oct. 20, 2003, now U.S. Pat. No. 6,950,737; which is a continuation of U.S. patent application Ser. No. 10/209,444, filed on Jul. 30, 2002 now U.S. Pat. No. 6,684,148, entitled Transmission Control System; which claims priority to U.S. Provisional Patent Application Ser. No. 60/388,533, filed on Jun. 12, 2002; which are herein all incorporated by reference in their entirety. This application also claims priority to U.S. Provisional Patent Application Ser. No. 60/983,018, filed on Oct. 26, 2007, which is also incorporated by reference in its entirety.

BACKGROUND

A Pedal Based Speed Control (PBSC) system controls the speed of a vehicle according to the position of a foot pedal or other vehicle lever or actuator. In a PBSC system, a microprocessor identifies a reference speed corresponding to the pedal position and then adjusts the vehicle travel speed to correspond to the identified reference speed.

The PBSC system is different from conventional accelerator based systems where an accelerator pedal is connected directly to the throttle of an engine. With conventional accelerator based systems, an operator presses down or lifts up on the accelerator pedal to control engine acceleration or deceleration (torque). While the vehicle speed may not change instantaneously, the vehicle engine still appears to the operator as responding immediately to changes in the accelerator pedal position.

In PBSC systems there are time gaps between a change in the foot pedal position and a change in the vehicle travel speed. This delay can be caused by multiple different factors. For example, delays in the vehicle travel speed may be attributable to engine response delay, mechanical/electro-hydrostatic actuator delay, filtering delay, discrete control delay, and/or communication delay. These time gaps seriously reduce the stability of PBSC systems and restrict the tuning scope of feedback gains, and therefore results in poor speed tracking performance.

SUMMARY OF THE INVENTION

A predictive speed controller is used to compensate for time delays in vehicle response. In one embodiment, an Enhanced Smith Predictor (ESP) is used to predict speed response changes between the physical vehicle system and the equivalent virtual vehicle system without time delays. The predicted changes are then used to adjust the actual speed feedback of the vehicle. The ESP achieves accurate non-time-delay output feedback for high performance pedal based speed control and incorporates vehicle models and an asymptotic output observer to robustly compensate for modeling errors.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIGS. 8A-8C show one application of the predictive speed controller used for controlling a power shift transmission.

DETAILED DESCRIPTION

Figure 1:
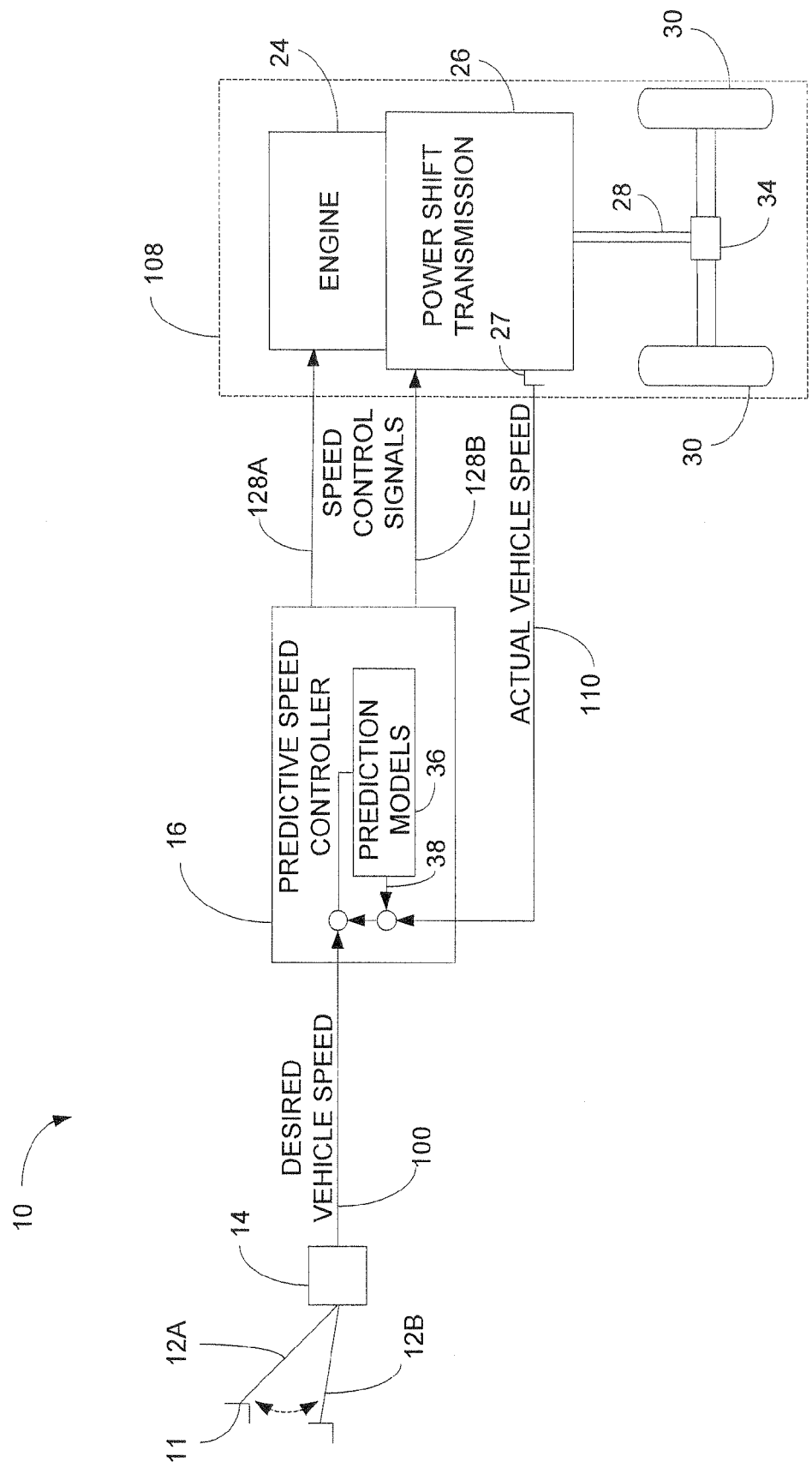
FIG. 1 is a block diagram of a vehicle that uses a predictive speed controller.

FIG. 1 is a schematic diagram showing one example of a predictive speed controller 16 used in a Pedal Based Speed Control (PBSC) system 10. The PBSC system 10 includes an actuator 11 that is used by a vehicle operator to select a desired vehicle speed. The actuator 11 can be a pedal, lever, or any other type of controller used by the vehicle operator to control the speed of vehicle 10. In this example, a foot pedal is used as the actuator 11. A position sensor 14 generates a signal 100 that corresponds with the position of foot pedal 11. The signal 100 is also associated with a desired vehicle speed.

The predictive speed controller 16 converts the desired speed signal 100 from position sensor 14 into one or more speed control signals 128 that control the actual speed 110 of a vehicle 108. For example, a first speed control signal 128A may control the speed of an engine 24 and one or more other speed control signals 128B may control the operations of a power shift transmission 26. The engine 24 and power shift transmission 26 combine to control the rotational speed of an output shaft 28 that, in turn, control the rotational speed of a drive axle 34 and wheels 30.

Delays in the vehicle 108 can create different speed control problems. In one example, an operator may press down or lift up on the foot pedal 11 to either increase or decrease the speed of vehicle 108. However, there may be a time gap from when the operator changes the foot pedal position 12 to when the vehicle 108 actually responds to the new foot pedal position. Again, these time gaps may be due to delays in the response of engine 24, mechanical/electro-hydrostatic actuator delay in the power shift transmission 26, filter delays, discrete control delays and other electronic and hydraulic control delays.

These time delays may cause the operator to press further down on the foot pedal 11 than necessary, lift further up on the foot pedal 11 than necessary, and generally move the foot pedal 11 to different undesired positions 12 that result in unexpected changes in the actual vehicle speed 110. For example, the vehicle operator may press the foot pedal down to a position 12A expecting a slight increase in the vehicle speed. Because there is no immediate vehicle response, the vehicle operator may press further down on the foot pedal to position 12B. However the foot pedal position 12B corresponds to a faster desired vehicle speed than originally intended by the operator. In a delayed response, the vehicle 108 lurches to the faster than intended vehicle speed associated with pedal position 12B.

Consequences of this delayed vehicle response include reduced vehicle stability, poor pedal based speed control that results in jerks, and slow response due to compromises in gain turning.

The predictive speed controller 16 compensates for these inherent vehicle time delays. The predictive speed controller 16, in one example, is a microprocessor that executes software instructions that are stored in either internal or external memory. In other embodiments, the predictive speed controller 16 may be implemented using discrete logic elements and/or electro-mechanical components.

The predictive speed controller 16 monitors the desired vehicle speed 100 associated with the foot pedal position 12 and simulates vehicle responses 38 that essentially predict what vehicle speed was actually intended by the vehicle operator. In one embodiment, the controller 16 uses one or more prediction models 36 to generate the simulated vehicle responses 38. The controller 16 then uses a compensation value derived from the simulated vehicle responses 38 to adjust the speed control signals 128 used for controlling the speed of vehicle 108.

Figure 2:
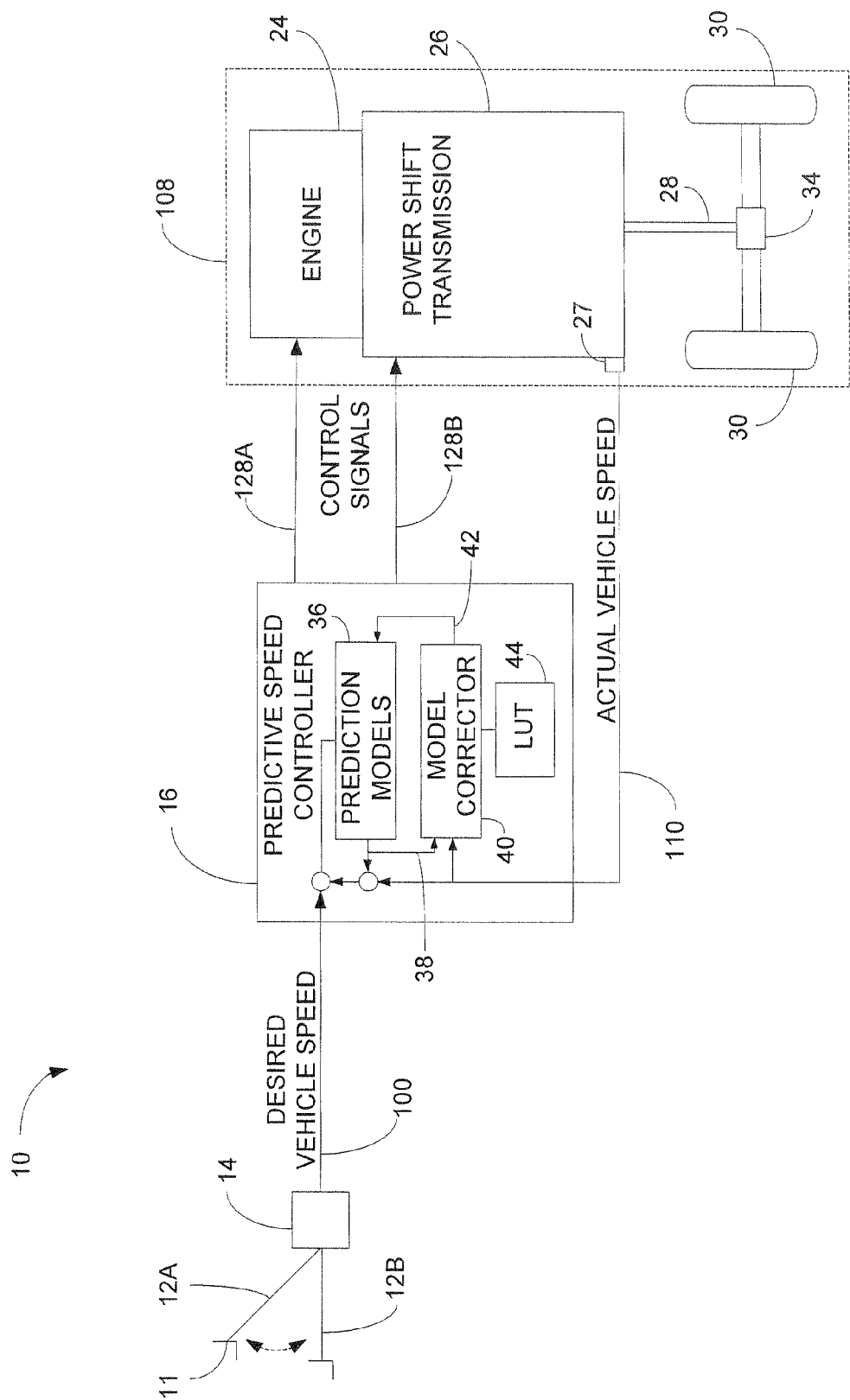
FIG. 2 is a block diagram of the vehicle shown in FIG. 1 that uses a predictive speed controller with model correction.

Referring to FIG. 2, predictive speed control may be limited by the accuracy of the models 36 used for simulating/predicting the vehicle response. Accordingly, a model corrector 40 is used to dynamically identify errors in the prediction models 36. The model corrector 40 identifies the modeling error by comparing the simulated vehicle response 38 with the actual vehicle speed 110. A correction value 42 corresponding to the identified modeling error is applied to one or more of the models 36. The corrected model response 38 is then used for generating a more accurate speed compensation value.

In one embodiment, a Look-Up Table (LUT) 44 contains different gain values associated with different vehicle speeds 110. The gain value associated with the currently detected vehicle speed 110 is then used to dynamically correct for the detected modeling error. The LUT 44 may contain different predetermined sets of gain values that can be used for different vehicle operations or different vehicle conditions. For example, a first set of gain values may be used when the vehicle 108 is carrying little or no load, and a second set of gain values may be used when the vehicle 10 is carrying a relatively heavy load. In another embodiment, the model corrector 40 may use yet another set of gain values when the vehicle is traveling at different speed ranges or when traveling down or up different grades.

Thus, the predictive speed controller 16 monitors a pedal position 12 that correspond to a desired vehicle speed 100. Prediction models 36 simulate vehicle responses corresponding to the desired vehicle speed to identify predicted speed differences between a vehicle response with a time delay and a vehicle response without a time delay. This predicted speed difference corresponds with a prediction of an intended speed. The prediction results are then used to compensate for time delays in the actual vehicle response.

The predictive speed controller 16 provides steady slow speeds when the vehicle 108 travels down a slope, allows small slow speed position changes close to loads when beginning from a stopped position, improves steady travel speed on level surfaces when sudden throttle commands are initiated, and eliminates abrupt vehicle acceleration and deceleration (jerk).

Smith Predictor

Figure 3:
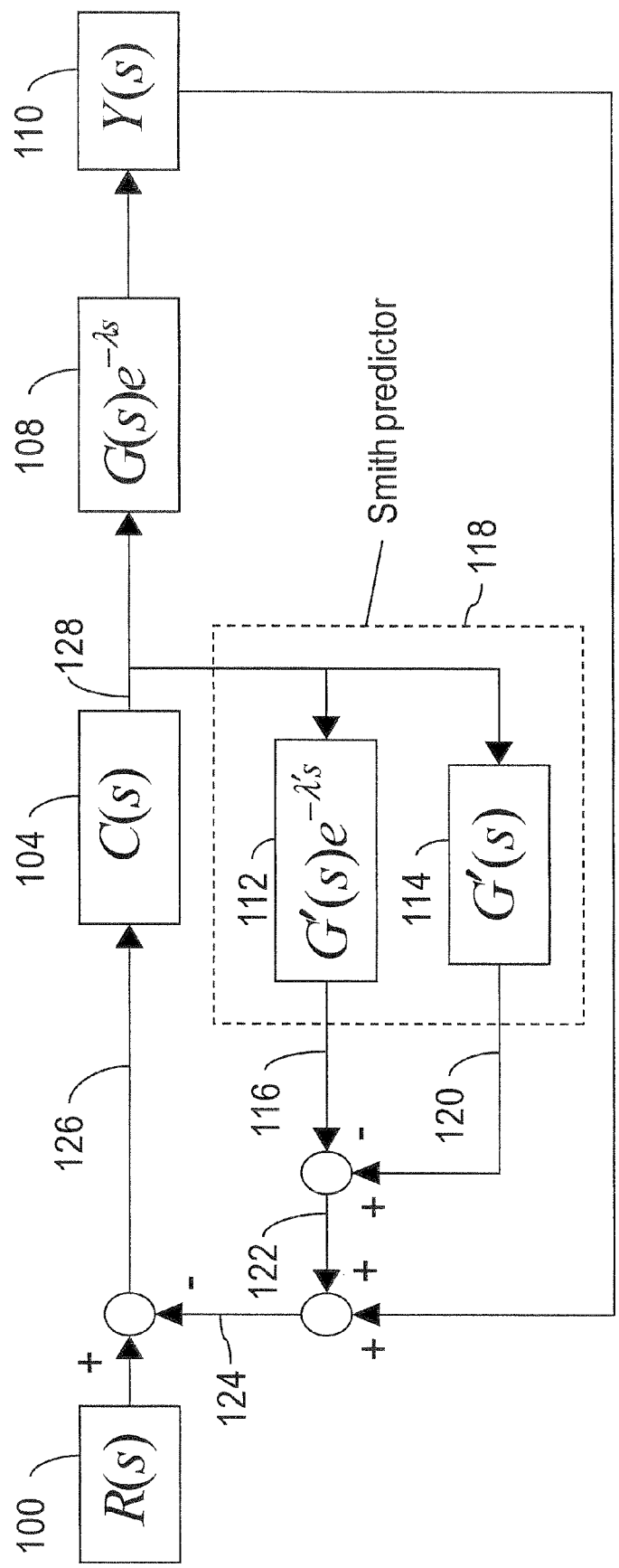
FIGS. 3 and 4 are block diagrams of the predictive speed controller in FIG. 1 implemented using a Smith Predictor.
Figure 4:
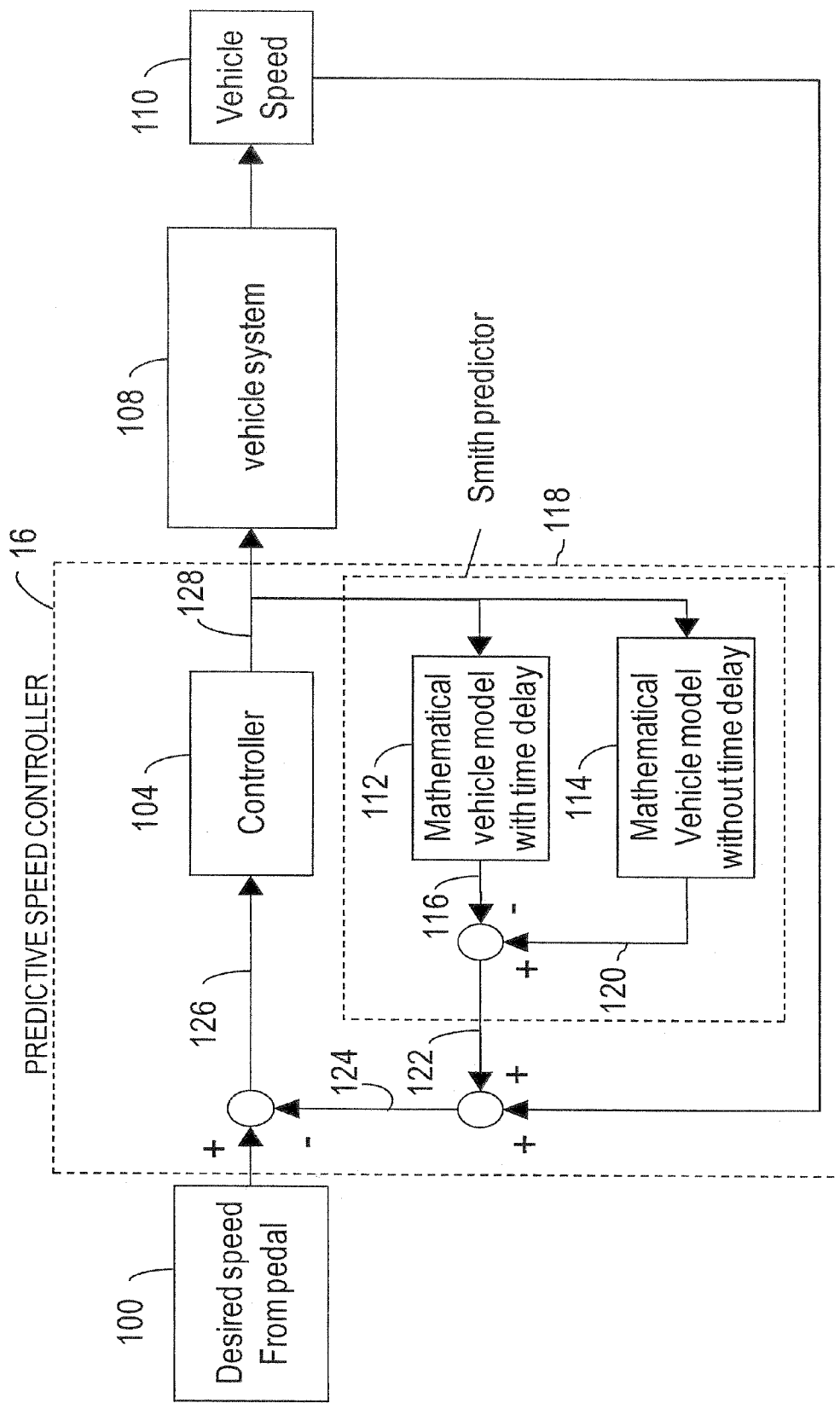

FIG. 3 shows in more detail one implementation of the predictive speed controller 16 that uses a Smith Predictor 118. FIG. 4 provides a more detailed description of the operations performed in FIG. 3. The descriptions of the operations in FIGS. 3 and 4 are described below.

100—R(s) is a reference speed input, which in one embodiment, is the desired speed selected by the operator through the position 12 of pedal 11 (FIG. 1). s means that the reference input is expressed in Laplace space. This applies to all other places where s appears.

104—C(s) is the designed controller, which in one embodiment, is a Proportional-Integral (PI) controller. The controller 104 generates a desired control force 128 used for controlling the speed of vehicle 108 in FIG. 1.

108—$G(s)e^{-\lambda s}$ is the real-world vehicle system with a real-world time delay. The value $\lambda$ is the real-world time delay.

110—Y(s) is the system output, which in one embodiment, is the vehicle speed measured through an on-board speed sensor 27 (FIG. 1).

112—$G'(s)e^{-\lambda' s}$ is a mathematical model that simulates the vehicle response with an estimated time delay. The value $\lambda'$ is the estimated time delay.

114—G'(s) is a model that estimates the vehicle response without the time delay.

116—The output of model 112 is referred to as the predicted travel speed with time delay.

118—The Smith Predictor includes the model 112 and model 114 and generates an output $G'(s) - G'(s)e^{-\lambda' s}$.

120—The output of model 114 is referred to as the predicted travel speed with no time delay.

122—The difference between the predicted travel speed with time delay 116 and the predicted travel speed without time delay 120 is referred to as the time delay compensation 122. The time delay compensation 122 is essentially a prediction of changes to the vehicle speed caused by time delays in the vehicle response.

124—The final predicted travel speed combines the actual travel speed 110 with the time delay compensation 122.

126—The predicted travel speed tracking error is the difference between the desired speed 100 and the final predicted travel speed 124.

128—The desired control force corresponds to one or more control signals or control data output by the controller 104 to control the speed of vehicle 108 (FIG. 1).

The desired control force 128 is increased when the value for the tracking error 126 is positive (+), corresponding to vehicle acceleration. The desired control force 128 is decreased when the value of the tracking error 126 is negative (−), corresponding to vehicle deceleration.

Enhanced Smith Prediction

From the two diagrams in FIGS. 3 and 4, it can be seen that the Smith Predictor 118 derives a time delay compensation value 122 by comparing and feeding back the predicted speed values output by the two models 112 and 114. Model 112 generates a predicted vehicle speed with a time delay 116 and model 114 generates a predicted vehicle speed with no time delay 120. Since the Smith Predictor 118 is an open-loop compensation system, more accurate real-world system models 112 and 114 will provide more accurate vehicle speed prediction. However, the time delay compensation value 122 may drift over time, if the vehicle system models 112 and 114 do not match the real-world vehicle 108.

Figure 5:
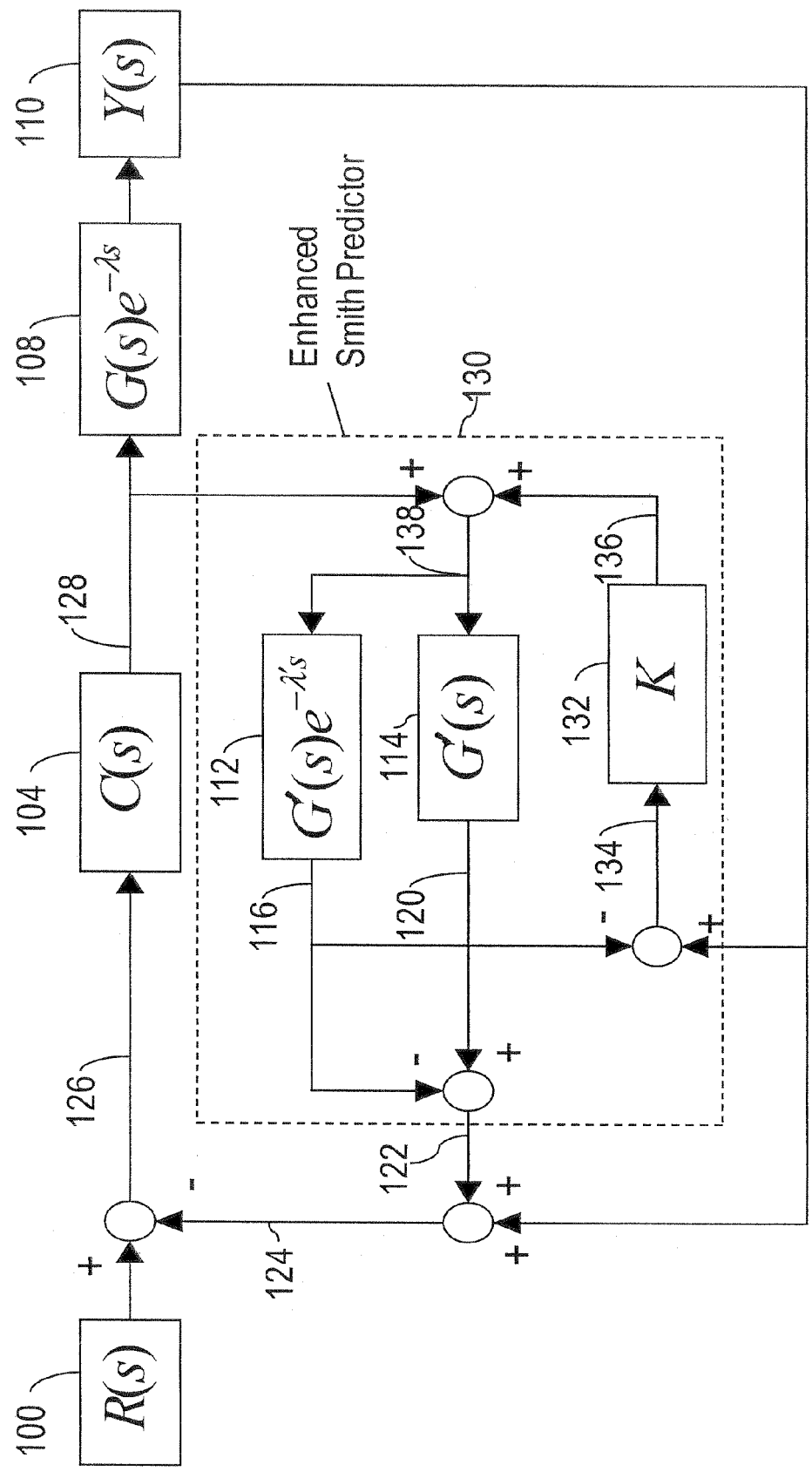
FIGS. 5 and 6 are block diagrams of the predictive speed controller in FIG. 2 implemented using an Enhanced Smith Predictor (ESP).

Accurate modeling is difficult for industrial vehicle applications. This is due to the nonlinearity of the vehicle system, variations in the vehicle workload, and variations in the vehicle working environment. An Enhanced Smith Predictor (ESP) is used to compensate for modeling errors. FIG. 5 shows a Laplace representation of a predictive speed controller 16 that uses the ESP 130 and FIG. 6 further describes the operations shown in FIG. 5.

The operations 100-128 are substantially the same as previously described in FIGS. 3 and 4, but are explained again for completeness.

100—R(s) is a reference speed input, which in one embodiment, is the desired speed selected by the operator through the position 12 of pedal 11 (FIG. 1). s means that the reference input is expressed in Laplace space. This applies to all other places where s appears.

104—C(s) is a Proportional-Integral (PI) controller. The controller 104 generates a desired control force 106 used for controlling the speed of vehicle 108.

108—$G(s)e^{-\lambda s}$ is the real-world vehicle system with a real-world time delay. The value $\lambda$ is the real-world time delay.

110—Y(s) is the system output, which in one embodiment is the vehicle speed measured through on-board speed sensor 27 (FIG. 1).

112—$G'(s)e^{-\lambda' s}$ is a mathematical model that simulates the vehicle response with an estimated time delay $\lambda'$. In one embodiment, a mass/viscous-damper system is used as the vehicle system model 112.

114—G'(s) is a model that estimates the vehicle response without the time delay. As mentioned above, a mass/viscous-damper system could be used as the vehicle system model 114.

116—The output of model 112 is referred to as the predicted travel speed with time delay.

118—The Enhanced Smith Predictor includes the model 112 and model 114, which can be written as $G'(s)\text{-}G'(s)e^{-\lambda' s}$.

120—The output of model 114 is referred to as the predicted travel speed with no time delay.

122—The difference between the predicted travel speed with delay 116 and the predicted travel speed without delay 120 is again referred to as the time delay compensation 122.

124—The final predicted travel speed combines the actual travel speed 110 with the time delay compensation 122.

126—The predicted travel speed tracking error is the difference between the desired speed 100 and the final predicted travel speed.

128—The desired control force corresponds to one or more control signals or data generated by the controller 104 to control the speed of vehicle 108 (FIG. 1).

130—The Enhanced Smith Predictor (ESP) includes model 112, model 114, and a model corrector 132.

132—The model corrector applies gain value K to a modeling error 124. The gain value K is derived through experiments and saved in the look-up table 44 previously shown in FIG. 2.

134—The difference value between the predicted vehicle travel speed with time delay 116 and the actual vehicle travel speed 110.

136—The modeling error feedback from the model corrector 132.

138—The sum of control force 128 and the modeling error feedback 136. The value 138 is used for driving both models 112 and 114 to achieve asymptotic convergence to the real world actual speed 110.

The model corrector 132 identifies the difference (modeling error) 134 between the predicted vehicle travel speed with time delay 116 and the actual vehicle travel speed 110 for the vehicle 108. The model corrector 132 applies the amplified gain K to the modeling error 134 and feeds the amplified modeling error 136 back into both model 112 and model 114. When the K value is properly tuned, the output 122 of ESP 130 will asymptotically converge to the time-delay generated output offset, and therefore compensate for the modeling error.

Operation

Figure 6:
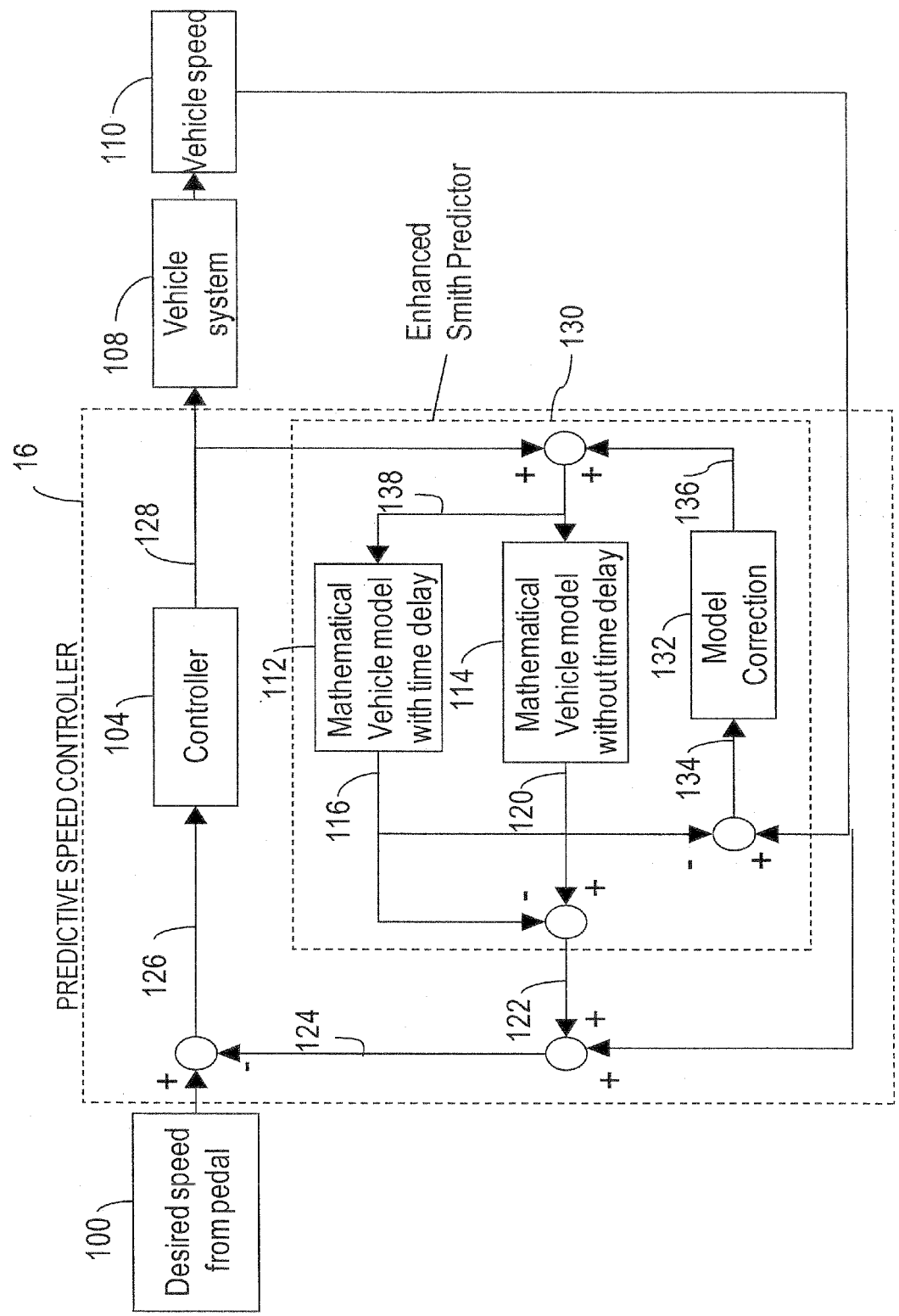

Referring to FIGS. 2 and 6, in one embodiment, the predictive speed controller 16 with the Enhanced Smith Predictor (ESP) 130 is used to control the engine 24 and the power shift transmission 26 in an industrial vehicle 108, such as a lift truck. However, it should be understood that the ESP 130 described above can be used to achieve target behaviors for any physical system that exhibits time delays when executing commands. This could include vehicle or control system that exhibit time delays.

The desired vehicle travel speed 100 may be controlled by a vehicle operator. For example, the vehicle operator may move the position of pedal 11 to change a desired speed for the vehicle 108. The position sensor 14 sends a signal corresponding to the pedal position 12 to the predictive speed controller 16. As mentioned above, in one implementation, the operations performed by the predictive speed controller 16 are carried out by a microcontroller or microprocessor that executes software instructions stored in a storage medium. The microprocessor operating predictive speed controller 16 converts the foot pedal position signal from position sensor 14 into the desired travel speed 100.

The desired travel speed 100 is compared with the final predicted travel speed 124 to produce the predicted travel speed tracking error 126. The PI controller 104 is another function performed by the microprocessor that generates a desired control force 128. The desired control force 128 can be different control signals or data sent to the real-world vehicle system 108. The real-world vehicle system 108 may include one or more microcontrollers, valves, power shift transmission 26, engine 24, drive axle 34, and wheels 30, among other things. The control signals corresponding to the desired control force 128 are acted upon by the real-world vehicle system 108 to produce the actual vehicle travel speed 110.

The speed control information associated with the desired control force 128 is also fed into the Enhanced Smith Predictor 130 and combined with the modeling error feedback value 136 generated from the model corrector 132. The sum of the desired control force 128 and the error feedback value 136 is input into both mathematical models 112 and 114.

The predicted/simulated travel speed with time delay 116 is fed into the model corrector 132. The model corrector 132 determines the difference 134 between the predicted vehicle travel speed with time delay 116 and the actual vehicle travel speed 110. The model corrector 132 then applies a gain value K to the difference 134 to produce the modeling error feedback value 136. The sum of the modeling error feedback value 136 and the desired control force 128 works to create the predicted travel speed with time delay 116 that asymptotically converges to the real world vehicle speed 110, and thereby compensates the modeling error.

The sum of the desired control force 128 and modeling error feedback value 136 is input into both the model 112 and the model 114. The predicted travel speed with time delay 116 from model 112 is compared with the predicted travel speed with no time delay 120 from model 114 to produce the time delay compensation value 122. A sum of the time delay compensation value 122 and the actual vehicle travel speed 110 is used as the final predicted travel speed 124. The final predicted travel speed 124 is then used to offset the actual desired vehicle speed 100.

The ESP 130 compensates for changes in the desired speed 100 caused by the time delay from when the operator selects a new desired speed 100 to when the industrial vehicle responds to the new selected speed. The ESP 130 provides a high-performance feedback control design, and therefore, achieves good PBSC performance.

Vehicle Modeling

Figure 7:
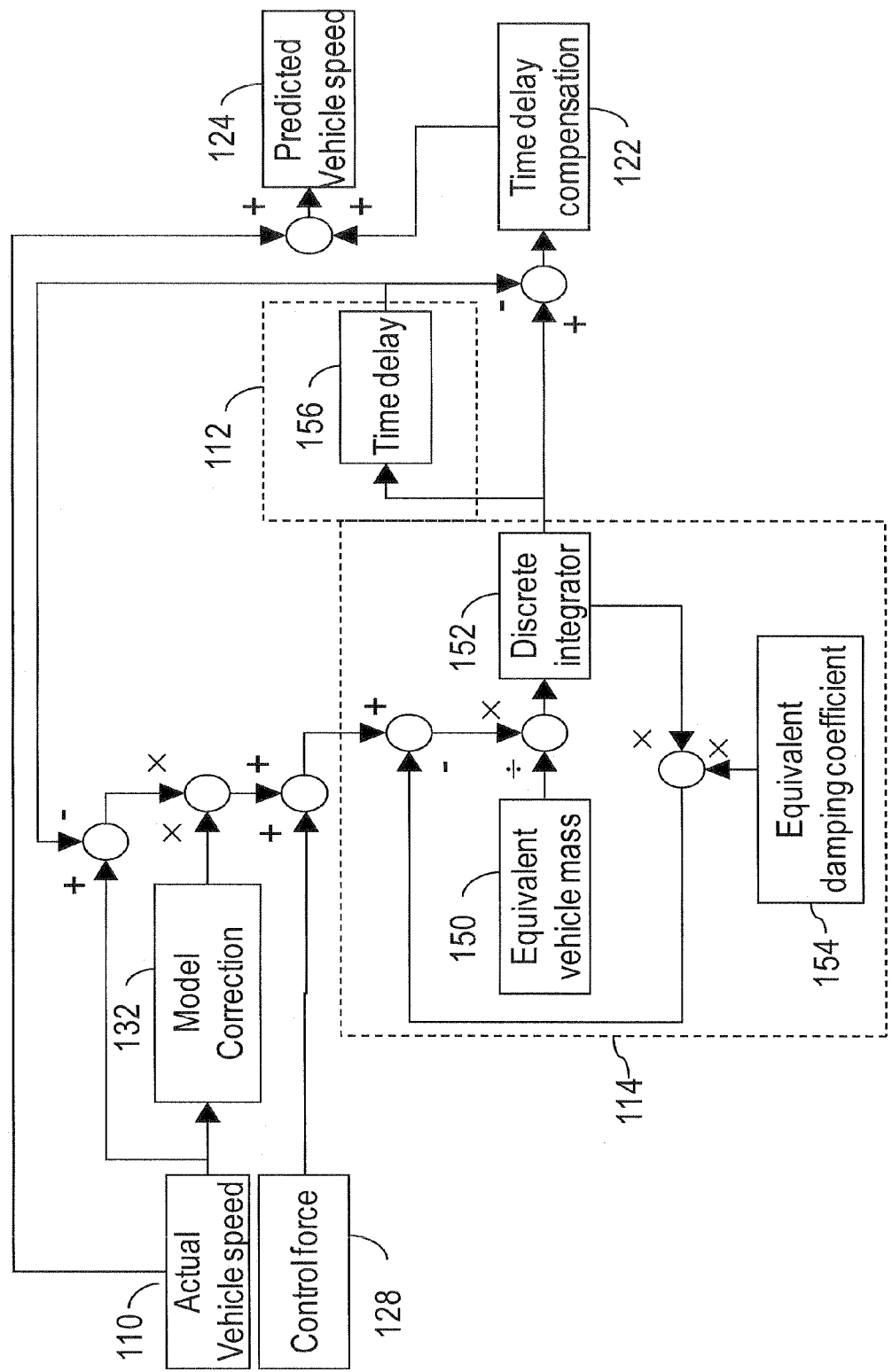
FIG. 7 is a block diagram describing in more detail the models used in the predictive speed controller.

FIG. 7 shows a more detailed example of how the models 112 and 114 are implemented in the ESP 130 of FIG. 6. Of course other model implementations could also be used.

128—The control force is the signal or information output by the controller 104 in FIG. 6 and is used for controlling the speed of vehicle 108 (FIG. 2). As explained above, in one embodiment the controller 104 is a Proportional-Integral (PI) controller.

110—The actual vehicle travel speed is reported by an on-board speed sensor 27 (FIG. 2).

114—This vehicle model 114 uses a simplified mass/viscous-damper model to estimate the vehicle response with no time delay. The model 112 with time delay is achieved by applying a time delay 156 serially to the output of the non-time delayed vehicle model 114.

The dynamics equation used to create the vehicle models is expressed by the following equation:

$$M\dot{v}+Cv=F$$

where:
M=the equivalent mass of the vehicle.
$\dot{v}$=acceleration of the vehicle system model.
v=velocity of the vehicle system model.
C=equivalent damping coefficient.
F=input force to the vehicle system model.

The implementation in the vehicle model is an equivalent derivative of the above initial mathematical model equation:

$$\dot{v} = \frac{F - Cv}{M}$$

122—The time delay compensation value is the difference between the two vehicle system models 112 and 114 with and without time delay, respectively.

124—The predicted vehicle speed is the summation of the actual vehicle speed and the time delay compensation value. This predicted vehicle speed is a predictor of what speed the vehicle operator actually intended to select.

132—The mode corrector uses the lookup table 44 (FIG. 2) to store the modeling error correction gains, K. Due to the nonlinearity of the vehicle dynamics, different gains are used with different vehicle speeds. These gains are derived offline from empirical data to ensure the model corrector 132 converges faster than the vehicle system dynamics, so that a converged observation can be used in the control system.

150—Equivalent vehicle mass. In order to minimize the modeling error in all kinds of working conditions, the equivalent vehicle mass is derived as the summation of the vehicle translation inertia, the vehicle rotational inertia, and half of the vehicle workload capacity.

154—Equivalent damping coefficient. Following the same principle of minimizing the modeling error, the equivalent damping coefficient is estimated with a half-loaded vehicle operating at a constant travel speed (0 acceleration) of 6 mph (median speed) on a level surface. The value of the damping coefficient 154 is the average control force divided by the travel speed.

152—The discrete integrator converts the acceleration signal into an estimated speed value output by the model 114.

156—As mentioned above, the time delay 156 is used to create the vehicle model 112 with time delay.

In another possible embodiment of the ESP based predictive controller 16, at a low travel speed, the original speed signal is used in place of the predicted signal from the Enhanced Smith Predictor 130, the P-gain in controller 104 is designed low, and a high I-gain is used to drive the vehicle 108.

Power Shift Transmissions

Figure 8A:
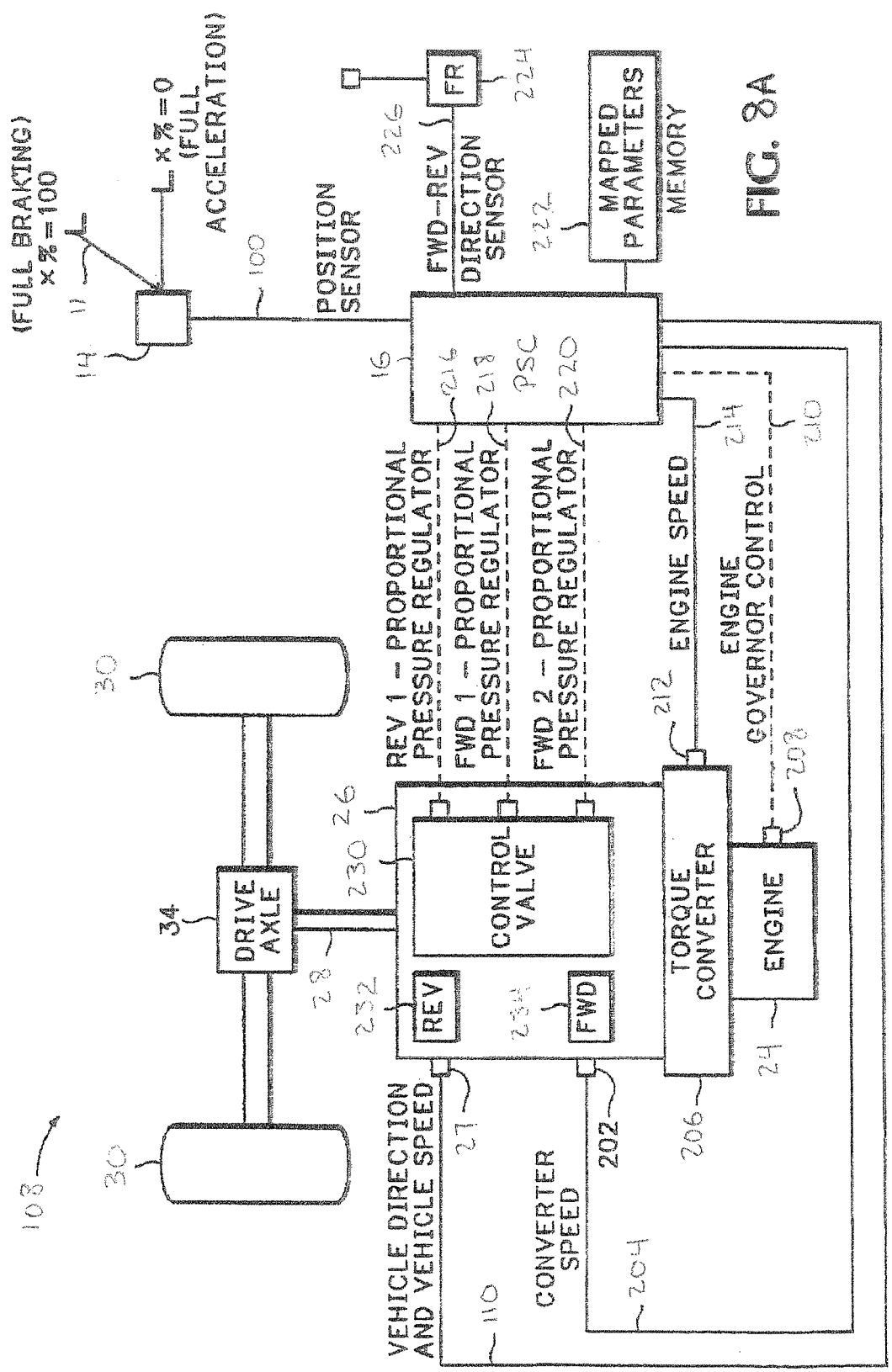
Figure 8B:
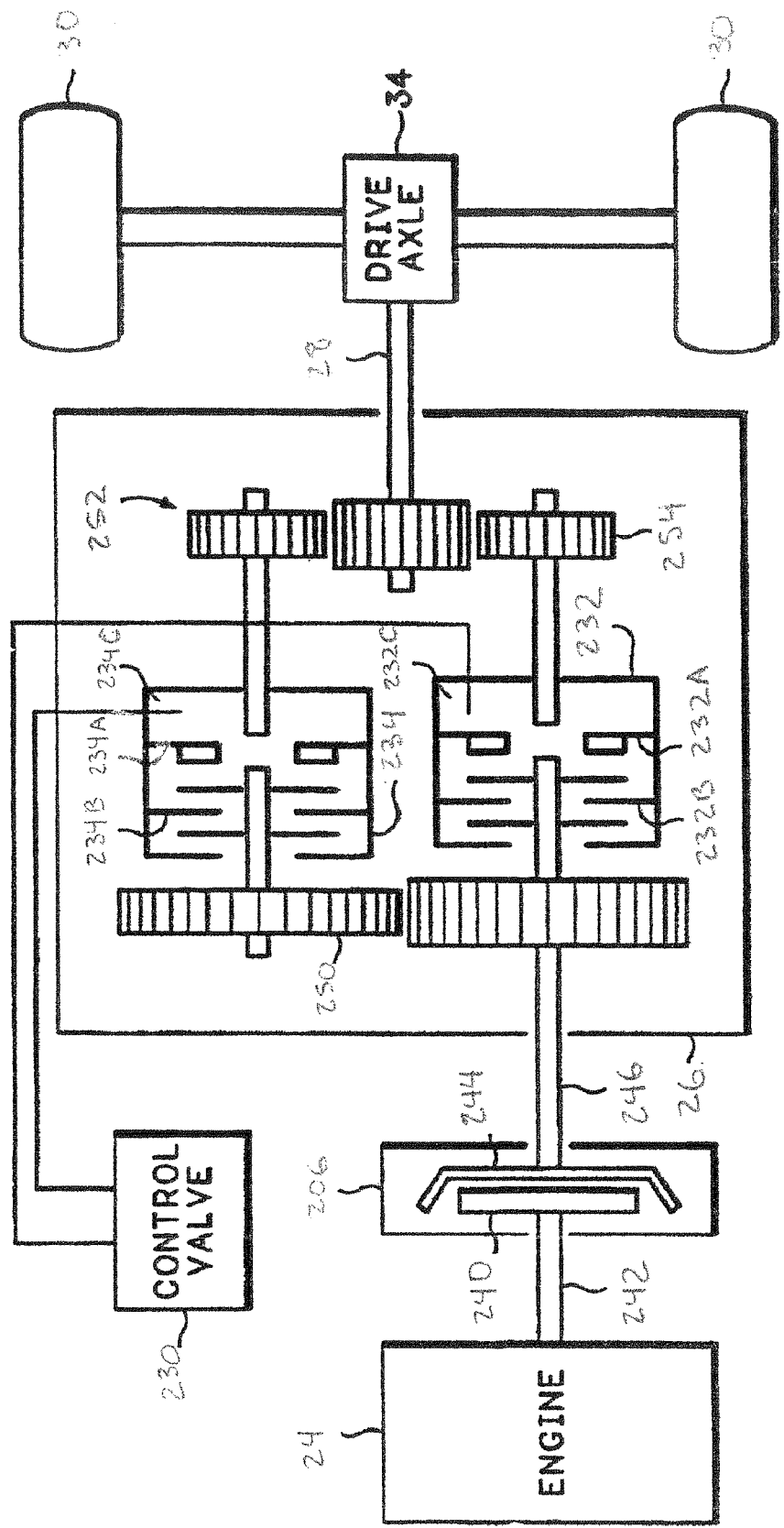

FIGS. 8A-8C describe in more detail how the predictive speed controller 16 is used in conjunction with a power shift transmission. FIG. 8A shows portions of the vehicle 108 including the power shift transmission 26 connected to the engine 24 by a hydraulic torque converter 206. An output shaft 28 of the transmission 26 is connected to the drive axle 34 that drives wheels 30. The power shift transmission 14 can also be used in a variety of other vehicles.

The same microprocessor that operates the predictive speed controller 16 may also control activation of a forward clutch pack (FWD) 234 and a reverse clutch pack (REV) 232 in the transmission 26 using any of the predictive speed control schemes described above. A control valve 230 in the transmission 26 controls fluid pressure that activates the two clutch packets 232 and 234.

The controller 16 receives vehicle speed and direction signal 110 from the vehicle speed sensor 27 indicating the rotational speed and direction of the axle 28. A converter speed signal 204 is generated from a torque converter speed sensor 202 and indicates the rotational speed of an output shaft 246 (FIG. 8B) of the torque converter 206. An engine speed signal 214 is generated from an engine speed sensor 212 and indicates how fast an output shaft 242 (FIG. 8B) of the engine 24 is rotating. An engine governor control signal 210 controls a throttle valve 208 that controls the speed of engine 24.

The controller 16 receives the pedal position signal 100 from the position sensor 14 on foot pedal 11. The pedal position can alternatively refer to a throttle value, acceleration value, or a deceleration value. A forward-reverse direction signal 226 is generated by a direction lever or pedal 224 and indicates a forward or backward direction the vehicle operator selects for the vehicle 108. An internal or external memory 222 contains mapped parameters identifying clutch pack pressure values and other control parameters used for performing different braking and speed control operations. The controller 16 selects these different pressure values according one or more of the predictive speed control schemes described above. In one embodiment, the memory 222 also contains the predetermined gain values used for correcting error in the prediction models (see FIGS. 2, 5, and 6)

FIG. 8B is a more detailed schematic diagram of a single speed power shift transmission. The torque converter 206 includes an impeller pump 240 and a turbine 244. A shaft 242 extends from the impeller pump 240 and is coupled to the crankshaft of engine 24. A shaft 246 extends from the turbine 244 and is coupled to the input of power shift transmission 26. The torque converter 206 continuously varies the ratio of the speed of the output shaft 246 to the speed of the input shaft 242 in accordance with the load on the output shaft 246.

The forward clutch pack 234 and the reverse clutch pack 232 each selectively engages and disengages the input shaft 246 with the output shaft 28 through the forward gears 252 and reverse gears 254. The engaging force of the clutches 234 and 232 are controlled by changing the oil pressure in oil chambers 234 C and 232C, respectively. The oil pressures provided by the control valve 230 is controlled by the desired control force signals 128 generated by the predictive speed controller 16 (FIG. 8A). In one embodiment, the clutch packs 234 and 232 are multiple disc hydraulic wet clutches.

When the clutch pressures are both zero, the clutches 234 and 232 disconnect the output shaft 28 from the input shaft 246. When the clutch pressure for either of the clutch packs is at a maximum pressure, the corresponding clutch pack maximizes the engaging force (locking). When the clutch pack pressure is between zero and the maximum value, the corresponding clutch pack is partially engaged. The partially engaged condition is referred to as clutch pack slipping. A FWD-1 signal 218 in FIG. 8A controls the oil pressure in the forward clutch pack 234. A REV-1 signal 216 in FIG. 8A controls the oil pressure in the REV clutch pack 232.

When the vehicle 10 is moving in a forward direction at a high speed in forward gear 252, the forward clutch pack 234 is partially engaged (not locked) and reverse clutch pack 232 and forward clutch pack 234 operate as a hydraulic brake. When the vehicle is moving backwards, in reverse gear 254, the reverse clutch 232 is partially engaged (not locked) and the forward clutch 234 and reverse clutch 232 operate as a hydraulic brake.

The two speed PS transmission is shown in FIG. 8C and includes two forward gears 260 and 250 and one reverse gear 254. A second forward multiple disk hydraulic wet clutch 262 selectively engages and disengages the input shaft 246 with the output shaft 28 through high forward gear 260.

When the vehicle 10 is moving in a forward direction at a high speed in high gear 260, the high forward clutch 262 is partially engaged (not locked) and the low forward clutch 234 and high forward clutch 262 operate as a hydraulic brake.

When the vehicle 10 is moving in a forward direction at a slower speed, the forward low clutch 234 is partially engaged (not locked) and the reverse clutch 232 and low forward clutch 234 function as a hydraulic brake. When the vehicle 10 is moving backward, the reverse clutch 232 is engaged (not locked) and the forward clutch 234 and reverse clutch 232 function as a hydraulic brake.

The single speed PS transmission in FIG. 8B, the multi-speed PS transmission shown in FIG. 8C, or any other combination of gears and clutch packs, can be controlled using the predictive speed controller 16 as described above in FIGS. 1-7.

The predictive speed controller 16 provides improved PBSC control of vehicles that use power shift transmissions. Specifically, the predictive speed controller 16 significantly improves travel speed control performance and eliminates abrupt acceleration and deceleration (jerk) due to time delays in vehicle response. In one application, the predictive speed controller 16 allows an operator to control the power shift transmission 26 very much like a highly responsive hydrostatic transmission. As a result, the vehicle 108 provides many of the control benefits of a hydrostatic transmission at the lower cost of a power shift transmission.

The operation of the power shift transmission is described in further detail in U.S. Pat. No. 6,684,148, entitled Transmission Control System which has been incorporated by reference in its entirety.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I/we claim all modifications and variation coming within the spirit and scope of the following claims.

The invention claimed is:

1. A vehicle speed control system, comprising:
a controller configured to:
receive a desired speed request for a vehicle;
simulate vehicle responses associated with the desired speed request;
derive a compensation value from the simulated vehicle responses associated with delays in the vehicle responding to the desired speed request; and
control the actual vehicle speed according to the compensation value.

2. The vehicle speed control system according to claim 1 wherein the controller is further configured to:
use one or more models to simulate the vehicle responses;
identify model errors by comparing the simulated vehicle responses with an actual vehicle response;
derive a correction value corresponding with the identified model errors; and
feed the correction value back into one or more of the models to generate corrected simulated vehicle responses.

3. The vehicle speed control system according to claim 2 wherein the controller is further configured to apply different gains to the identified modeling errors according to different associated actual vehicle speeds.

4. The vehicle speed control system according to claim 3 further comprising a look up table having a predetermined set of gain values that the controller applies to the identified modeling errors according to the actual vehicle speed.

5. The vehicle speed control system according to claim 4 further comprising different predetermined sets of gain values that are used by the controller for different vehicle operations or different vehicle conditions.

6. The vehicle speed control system according to claim 1 wherein the controller is further configured to:
use a first model to simulate a first vehicle response having a time delay;
use a second model to simulate a second vehicle response without the time delay; and
compare the first simulated vehicle response with the second simulated vehicle response to derive the compensation value.

7. The vehicle speed control system according to claim 6 wherein the first model and the second model together comprise a Smith Predictor.

8. The vehicle speed control system according to claim 7 wherein the controller is further configured to:
identify a modeling error in the Smith Predictor by comparing the first simulated vehicle response from the first model with the actual vehicle speed;
derive a correction value for the identified modeling error; and
apply the correction value to the first and second model in the Smith Predictor.

9. The vehicle speed control system according to claim 6 wherein the controller is further configured to output control values for controlling the actual speed of the vehicle and feed-back the control values to the first and second models to generate the first and second simulated vehicle response, respectively.

10. The vehicle speed control system according to claim 1 wherein the controller is further configured to:
simulate a response of an industrial vehicle that uses a power shift transmission;

derive the compensation value according to the simulated industrial vehicle response; and use the compensation value to control the speed of the industrial vehicle via the power shift transmission.

11. The vehicle speed control system according to claim 1 wherein the controller is further configured to:

monitor a speed pedal position that corresponds with the desired speed request;

use the simulated vehicle responses to generate a compensation value that predicts at least some changes in the vehicle speed caused by the delays of the vehicle responding to the desired speed request; and use the compensation value to compensate for at least some changes in the vehicle speed caused by the time delays.

12. A method, comprising:

receiving a speed control signal for controlling the speed of a vehicle;

predicting a first vehicle speed with a time delay according to the speed control signal;

predicting a second vehicle speed without the time delay according to the speed control signal;

identifying a difference between the first predicted vehicle speed and the second predicted vehicle speed; and using the identified difference between the first predicted vehicle speed and the second predicted vehicle speed as feed-back for adjusting the speed control signal.

13. The method according to claim 12 further comprising:

using a first mathematical model to predict the first vehicle speed; and using a second mathematical model to predict the second vehicle speed.

14. The method according to claim 13 further comprising:

identifying a modeling error by comparing the output from the first mathematical model with an actual vehicle speed;

deriving a correction value corresponding with the identified modeling error; and feeding the correction value back into the first and second mathematical models.

15. The method according to claim 14 further comprising:

storing a set of different predetermined gain values;

identifying one of the gain values associated with the actual vehicle speed; and applying the identified gain value to the identified modeling error to derive the correction values.

16. The method of claim 12 further comprising predicting the first vehicle speed and the second vehicle speed for a vehicle having a power shift transmission.

17. The method according to claim 12 further comprising deriving a compensation value according to the identified difference between the first predicted vehicle speed and the second predicted vehicle speed.

18. The method according to claim 17 further comprising:

combining an actual vehicle travel speed with the compensation value to derive a final predicted travel speed;

deriving a predicted travel speed tracking error by taking a difference between the desired vehicle speed and the final predicted travel speed; and adjusting the speed control signal according to the predicted travel speed tracking error.

19. A Pedal Based Speed Control (PBSC) system for an industrial vehicle, comprising:

a first sensor configured to identify different pedal positions corresponding to different selected travel speed;

a second sensor configured to identify an actual vehicle speed; and a processor configured to derive an intended travel speed that predicts what the vehicle travel speed would have been if the vehicle had little or no time delay responding to the selected travel speed, the processor further configured to control the actual vehicle speed according to the difference between the selected travel speed and the intended travel speed.

20. The PBSC system according to claim 19 wherein the processor is further configured to:

predict the vehicle speeds with a time delay and without a time delay;

subtract the differences between the predicted vehicle speeds to derive a time delay compensation value;

combine the actual vehicle speed with the time delay compensation value to derive the intended travel speed;

derive a travel speed tracking error by taking the difference between the selected travel speed and the intended travel speed; and adjusting the actual vehicle travel speed according to the derived travel speed tracking error.

21. The PBSC system according to claim 20 wherein the processor is further configured to:

use a first model to predict a response of a vehicle with a power shift transmission and with a time delay;

use a second model to predict a response of the vehicle with the power shift transmission and without a time delay; and compare prediction outputs from the first and second model to generate the time delay compensation value.

22. The PBSC system according to claim 21 wherein the processor is further configured to dynamically compensate for errors between the predicted responses and actual responses of the vehicle and power shift transmission.

23. The PBSC system according to claim 21 wherein the first and second model use:

a vehicle mass value representing vehicle translation inertia, a vehicle rotational inertia, and a vehicle workload capacity;

a damping coefficient representing a vehicle load and a constant travel speed; and a discrete integrator that converts an acceleration value generated according to the vehicle mass value and the damping coefficient into a speed signal.

24. The PBSC system according to claim 23 wherein the first and second models are implemented using the relationship:

$$\dot{v} = \frac{F - Cv}{M}$$

where

M=an equivalent mass of the vehicle;

$\dot{v}$=acceleration of the model;

v=velocity of the model;

C=an equivalent damping coefficient; and

F=input force to the model.

* * * * *

UNITED STATES PATENT AND TRADEMARK OFFICE
CERTIFICATE OF CORRECTION

PATENT NO.        : 8,135,531 B2
APPLICATION NO.   : 12/256445
DATED             : March 13, 2012
INVENTOR(S)       : Side Zhao et al.

It is certified that error appears in the above-identified patent and that said Letters Patent is hereby corrected as shown below:

Title Page, Column 1, line 10 ("Related U.S. Application Data"):

Delete "60/388,522," and insert -- 60/388,533 --;

and

Column 1, line 5:

Delete "7,974,768" and insert -- 7,974,760 --.

Signed and Sealed this
Sixth Day of November, 2012

David J. Kappos
*Director of the United States Patent and Trademark Office*